United States Patent
Movshovich et al.

(10) Patent No.: US 6,795,088 B2
(45) Date of Patent: Sep. 21, 2004

(54) METHOD AND SYSTEM FOR MORE EFFICIENTLY UTILIZING PROCESSORS OF A GRAPHICS SYSTEM

(75) Inventors: Aleksandr M. Movshovich, Santa Clara, CA (US); Brad A. Delanghe, San Jose, CA (US); David A. Baer, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 131 days.

(21) Appl. No.: 10/121,305

(22) Filed: Apr. 11, 2002

(65) Prior Publication Data

US 2003/0193506 A1 Oct. 16, 2003

(51) Int. Cl.$^7$ .................................. G09G 5/00
(52) U.S. Cl. ........................ 345/621; 345/625
(58) Field of Search .................... 345/505, 621, 345/553, 853, 501, 615, 538, 531, 422, 421, 619, 625, 629; 717/125; 709/106, 323; 707/7

(56) References Cited

U.S. PATENT DOCUMENTS 5,821,950 A * 10/1998 Rentschler et al. ......... 345/505
6,288,724 B1 * 9/2001 Kumar et al. ............... 345/621

* cited by examiner

Primary Examiner—Matthew C. Bella
Assistant Examiner—Dalip K. Singh
(74) Attorney, Agent, or Firm—Sawyer Law Group LLP (57) ABSTRACT

A method and system for utilizing processor(s) and bypass processor(s) of a computer graphics system are disclosed. The processor(s) and bypass processor(s) render primitives, which are ordered based on their left corners. The method and system include providing a merge circuit, a distributor, a feedback circuit and a controller. The merge circuit determines left and right edges for each primitive. The distributor is coupled with feedback circuit and outputs a first portion of the primitives. The distributor provides a second portion of the primitives to the processor(s) and a third portion of the primitives to the bypass processor(s) if the first portion includes more primitives than there are processor(s). The second portion includes no more primitives than there are processor(s). The feedback circuit, coupled to the merge circuit, re-inputs a fourth portion of the primitives to the bypass processor(s) until the first portion has been rendered for a line.

23 Claims, 7 Drawing Sheets

Prior Art
Figure 1

Prior Art

Figure 8B ly, the number of processors is on the order of sixteen or thirty-two. As a result, the number of primitives that overlap at a particular pixel and that can be processed for a line is limited to sixteen or thirty-two. The complexity of the frame is thereby limited. This limitation can be improved by increasing the number of processors. However, increasing the number of processors increases the space consumed by the graphics system, which is undesirable.

METHOD AND SYSTEM FOR MORE EFFICIENTLY UTILIZING PROCESSORS OF A GRAPHICS SYSTEM

CROSS-REFERENCE TO RELATED APPLICATIONS

The present application is related to co-pending U.S. patent application Ser. No. 09/978,476 entitled "Method and System for Efficiently Loading Primitives into Processors of a Graphics System," filed on Oct. 16, 2001 and assigned to the assignee of the present application. The present application is also related to co-pending U.S. patent application Ser. No. 09/583,063 entitled "Method and System for Providing Hardware Sort in a Graphics System," filed on May 30, 2000 and assigned to the assignee of the present application.

FIELD OF THE INVENTION

The present invention relates to computer graphics system, and more particularly to a method and system for more efficiently using processors of a computer graphics system for processing data for primitives.

BACKGROUND OF THE INVENTION

A conventional computer graphics system can display graphical images of objects on a display. The display includes a plurality of display elements, known as pixels, typically arranged in a grid. In order to display objects, the conventional computer graphics system typically breaks each object into a plurality of polygons, termed primitives. A conventional system then renders the primitives in a particular order.

Some computer graphics systems are capable of rendering the primitives in raster order. Such as system is described in U.S. Pat. No. 5,963,210, entitled "Graphics Processor, System and Method for Generating Screen Pixels in Raster Order Utilizing a Single Interpolator" and assigned to the assignee of the present application. In such a system, all of the primitives intersecting a particular pixel are rendered for that pixel. The primitives intersecting a next pixel in the line are then rendered. Typically, this process proceeds from left to right in the line until the line has been rendered, then recommences on the next line. The frame is rendered line by line, until the frame has been completed.

In order to render the frame, the primitives are loaded into processors. Typically, all of the primitives starting at a particular line are loaded into the processors at the start of the line. After the line has completed processing, primitives which have expired are ejected. An expired primitive is one which can not be present on the next line. In other words, an expired primitive has a bottom that is no lower than the line that was just processed. Any new primitives for the next line are loaded at the start of the next line. The line is then processed as described above. This procedure continues until the frame is rendered.

Although the system and method function well for there intended purpose and can render primitives in raster order, one of ordinary skill in the art will readily recognize that the system and method have limitations. In particular, the complexity of the frame being rendered is limited by the number of processors available. As described above, all of the primitives for line are provided to processors at the start of a line and ejected at the end of a line. The total number of primitives that can be provided to the processors is limited by the number of processors. Thus, the total number of primitives that can be rendered for a particular line is limited by the number of processors in the system. For similar reasons, the total number of primitives that can overlap at a particular pixel is also limited by the number of processors in the system. Typical Furthermore, the processes of loading primitives and ejecting expired primitives each consume time and resources. In addition, in a complex scene, many primitives might expire at the end of a particular line and a large number of primitives might start at the next line. Ejecting the expired primitives and loading the new primitives might cause a significant delay in the pipeline.

Accordingly, what is needed is a system and method for more efficiently utilizing the processors of a computer graphics system. The present invention addresses such a need.

SUMMARY OF THE INVENTION

The present invention provides a method and system for more efficiently utilizing at least one processor and at least one bypass processor of a computer graphics system. The processor(s) include a particular number of processors. In addition, the term bypass processor includes one or more bypass processors. The processor(s) and at least one bypass processor render a plurality of primitives. Each primitive has a left corner, a right corner and a top. The primitives are ordered based on the left corner of each of the plurality of primitives. The method and system include providing a merge circuit, a distributor and a feedback circuit. The merge circuit determines a left edge and a right edge for each of the plurality of primitives. The distributor is coupled with the feedback circuit and outputs a first portion of the plurality of primitives. The distributor provides a second portion of the plurality of primitives to the processor(s) and provides a third portion of the plurality of primitives to the at least one bypass processor if the first portion of the plurality of primitives includes more primitives than the particular number of processors. The second portion of the plurality of primitives includes a number of primitives that is not greater than the particular number of processors. The feedback circuit, which is coupled to the merge circuit and the distributor, re-inputs a fourth portion of the plurality of primitives to the at least one bypass processor until the first portion of the plurality of primitives has been rendered for a particular line. The controller controls the feedback circuit, the distributor and the merge circuit.

According to the system and method disclosed herein, the present invention provides a more efficient mechanism for utilizing the processors.

DETAILED DESCRIPTION OF THE INVENTION

The present invention relates to an improvement in computer graphics system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
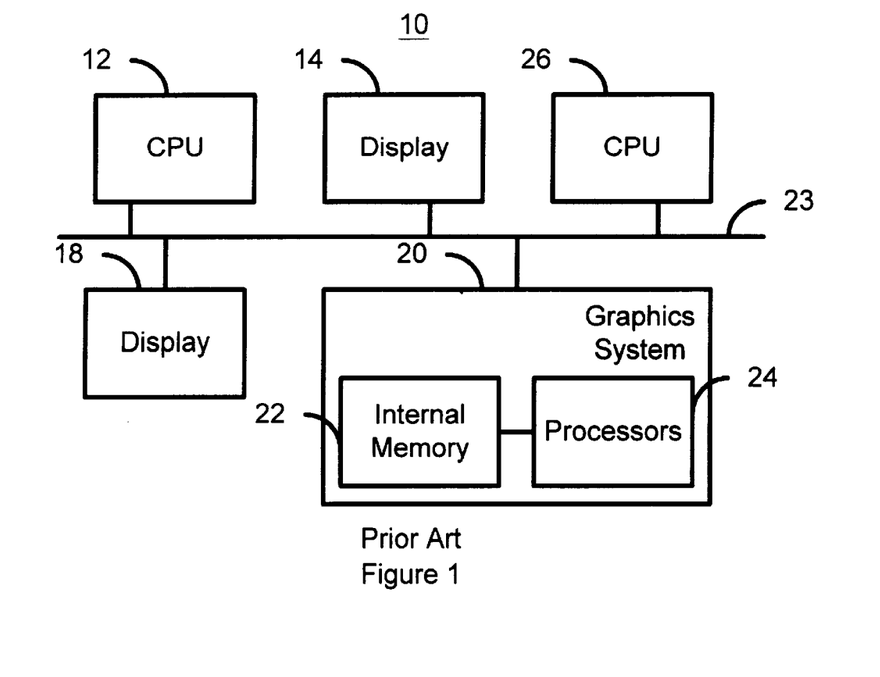
FIG. 1 is a block diagram of a computer system including a graphics system.

FIG. 1 is a block diagram of a computer system 10 including a computer graphics system 20. The computer system 10 also includes a central processing unit 12, a display 14, a user interface 16 such as a keyboard and/or mouse and a memory 18. The graphics system 20 is depicted as including an internal memory 22 and processors 24 that are coupled by a bus 23. The graphics system 20 typically has other components that are not shown for clarity.

Figure 2:
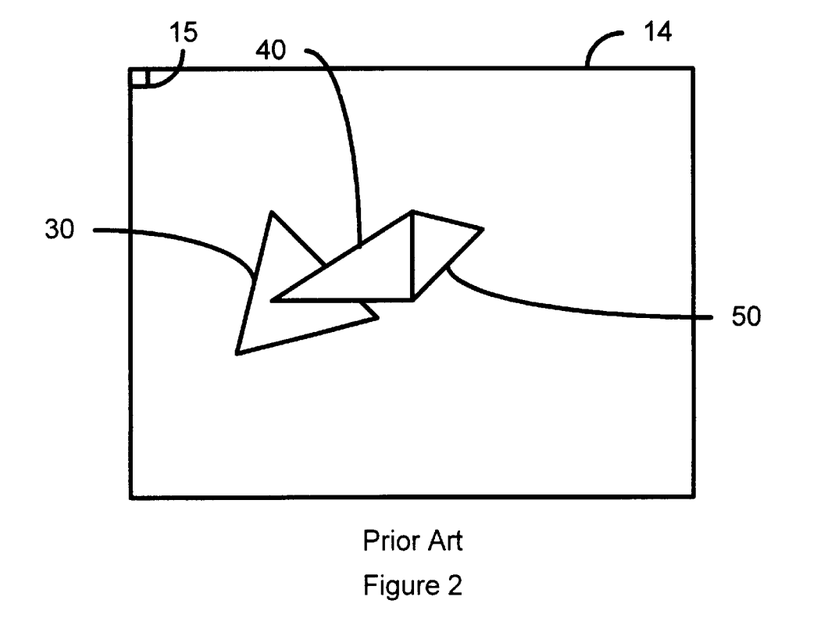
FIG. 2 is a diagram of a portion of a display including a plurality of primitives rendered for a frame.

FIG. 2 depicts a portion of the display 14. The display 14 includes a plurality of pixels. For clarity, only one pixel 15 is depicted. On the display are depicted primitives 30, 40 and 50. The primitives 30, 40 and 50 are typically part of a scene containing many primitives. The primitives in the scene may also overlap, as is shown for primitives 30 and 40.

Referring to FIGS. 1 and 2, in order to render a scene on the display 14, the graphics system 20 must render the polygons. In a graphics system 20 described in U.S. Pat. No. 5,963,210, entitled "GRAPHICS PROCESSOR, SYSTEM AND METHOD FOR GENERATING SCREEN PIXELS IN RASTER ORDER UTILIZING A SINGLE INTERPOLATOR" and assigned to the assignee of the present application, the graphics system 20 renders the primitives 30, 40 and 50 in raster order. In other words, the graphics system 20 renders a scene pixel by pixel in raster order. Thus, in the area where primitives 30 and 40 overlap, two primitives are rendered for each pixel. In order to render the scene, data for the primitives 30, 40 and 50 must be loaded from the internal memory 22 to the processors 24.

Figure 3:
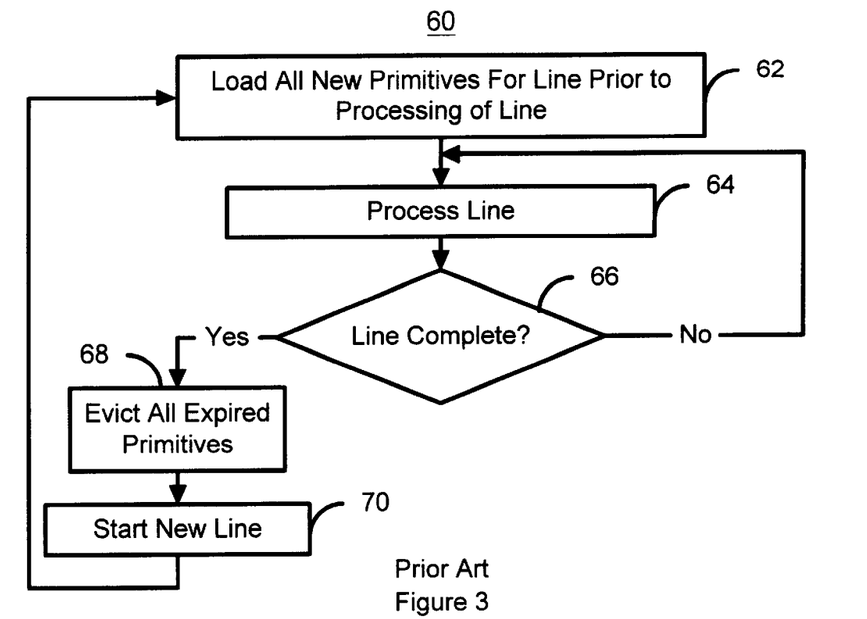
FIG. 3 is a flow chart a method for rendering primitives.

FIG. 3 depicts a high level flow chart of a method 60 for rendering primitives in a scene used in the above-mentioned U.S. patent. At the start of the line, new primitives for the line are loaded into the processors 24, via step 62. The primitives are loaded from the internal memory 22 to the processors 24. Thus, primitives which commenced at a previous line and which will contribute to the current line remain in the processors 24. The line is then processed, via step 64. Step 64 may include performing interpolation, texture processing, antialiasing or other operations used in rendering the scene. It is determined whether processing of the line is complete, via step 66. If not, then processing continues in step 64. If the line is completed, then the primitives that have expired are evicted from some or all of the processors 24, via step 68. A primitive that has expired cannot contribute to the next line and thus has a bottom that is no lower than the current line being processed. The new line is then commenced, via step 70. Any new primitives are then loaded, via step 62. The method 60 thus repeats until the frame has been rendered.

Although the method and system shown in FIGS. 1 and 3 function well for their intended purpose, one of ordinary skill in the art will readily realize that there are limitations. The number of primitives that can be processed for a particular pixel in a line and the number of primitives that can be processed for the entire line are limited by the number of primitives that can be loaded into the processor 24. This number is the same as the number of processors 24, which is typically sixteen or thirty-two. Thus, the complexity of the scene that can be rendered is limited. Although increasing the number of processors 24 addresses this problem, the space consumed by the graphics system 20 will also increased. Such an increase in space is undesirable. In addition, loading primitives in the processors 24 in step 62 requires time. Similarly, evicting primitives from the processor 24 in step 68 requires time. If a certain line differs significantly from a previous line, the number of primitives evicted and loaded may be quite large. This is particularly true if the bus 23 does not have sufficient throughput. As a result, the time required to perform steps 62 and 68 becomes significant, delaying completion of the frame by the graphics system 20.

The present invention provides a method and system for utilizing at least one processor and at least one bypass processor of a computer graphics system. The processor(s) include a particular number of processors. The processor(s) and at least one bypass processor render a plurality of primitives. Each primitive has a left corner, a right corner and a top. The primitives are ordered based on the left corner of each of the plurality of primitives. The method and system include providing a merge circuit, a distributor and a feedback circuit. The merge circuit determines a left edge and a right edge for each of the plurality of primitives per line. The distributor is coupled with the feedback circuit and outputs a first portion of the plurality of primitives. The distributor provides a second portion of the plurality of primitives to the processor(s) and provides a third portion of the plurality of primitives to the at least one bypass processor if the first portion of the plurality of primitives includes more primitives than the particular number of processors. The second portion of the plurality of primitives includes a number of primitives that is not greater than the particular number of processors. The feedback circuit, which is coupled to the merge circuit and the distributor, re-inputs a fourth portion of the plurality of primitives to the at least one bypass processor until the first portion of the plurality of primitives has been rendered for a particular line. The controller controls the feedback circuit, the distributor and the merge circuit.

Figure 4:
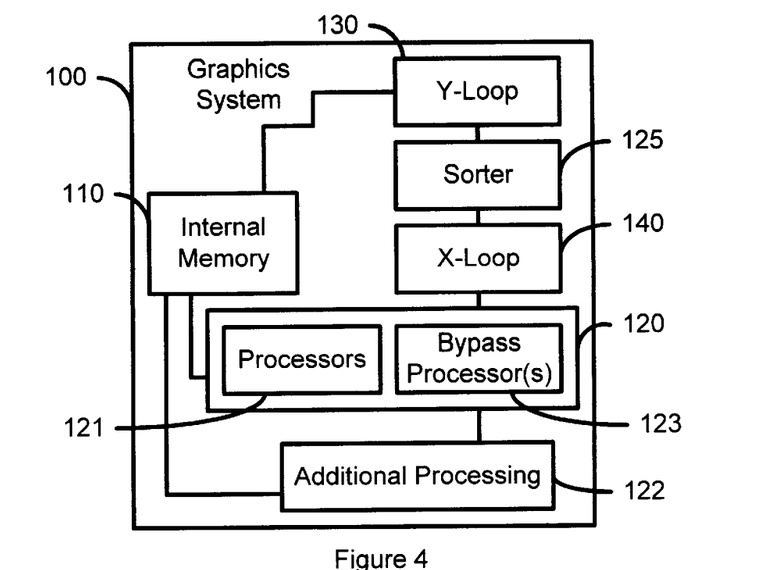
FIG. 4 is a block diagram of a preferred embodiment of a computer graphics system using one embodiment of a system in accordance with the present invention.

The present invention will be described in terms of a particular computer system, a particular computer graphics system, a particular set of components and a particular set of processors. However, one of ordinary skill in the art will readily recognize that this method and system will operate effectively for other computer system, other computer graphics systems, other and/or additional components and other numbers of processors. For example, the present invention is described using a single bypass processor and a single distributor. One of ordinary skill in the art will, however, recognize that the present invention is consistent with the user of multiple bypass processors and/or multiple distributors. Moreover, the present invention will be described as providing primitives and/or portions of primitives to components, such as processors. However, one of ordinary skill in the art will readily recognize that in a preferred embodiment, some portion of the data for the primitives are actually provided to the components. The present invention will also be described in the context of a system which feeds back the primitives which have not been evicted, using a y-loop circuit, and sorts the primitives using a hardware sorter. However, one of ordinary skill in the art will readily realize that present invention is consistent with a system that does not utilize a y-loop circuit or a hardware sorter To more particularly illustrate the method and system in accordance with the present invention, refer now to FIG. 4, depicting one embodiment of a computer graphics system 100 using one embodiment of a system in accordance with the present invention. The computer graphics system 100 is preferably used in the computer system 10 in place of the computer graphics system 20. The computer graphics system 100 includes a system 140 in accordance with the present invention for more efficiently using processors in the computer graphics system 100. The system 140 is termed herein an x-loop system 140. The computer graphics system 100 also includes an internal memory 110, a processor block 120, additional processing circuitry 122, y-loop circuitry 130, and a sorter 125. The processor block 120 includes processors 121 and a bypass processor 123. In a preferred embodiment, there are sixteen processors 121. The additional processing circuitry 122 could include one or more interpolators, sorters, antialiasing units and other circuitry actually used in rendering the frame. Some embodiments of the additional processing circuitry 122 are described in the above-mentioned U.S. patent. The internal memory 110 is preferably a random access memory ("RAM") 110. Data for the primitives are preferably loaded into the RAM 110. This data preferably includes an identifier for each primitive, the top and bottom coordinates for each primitive and can include texture, color, or other data used in processing the primitive. The y-loop circuitry 130 and sorter 125 are provided in a preferred embodiment. However, the system 140 in accordance with the present invention could be used within a system not using the y-loop circuitry 130 and the sorter 125.

Figure 5:
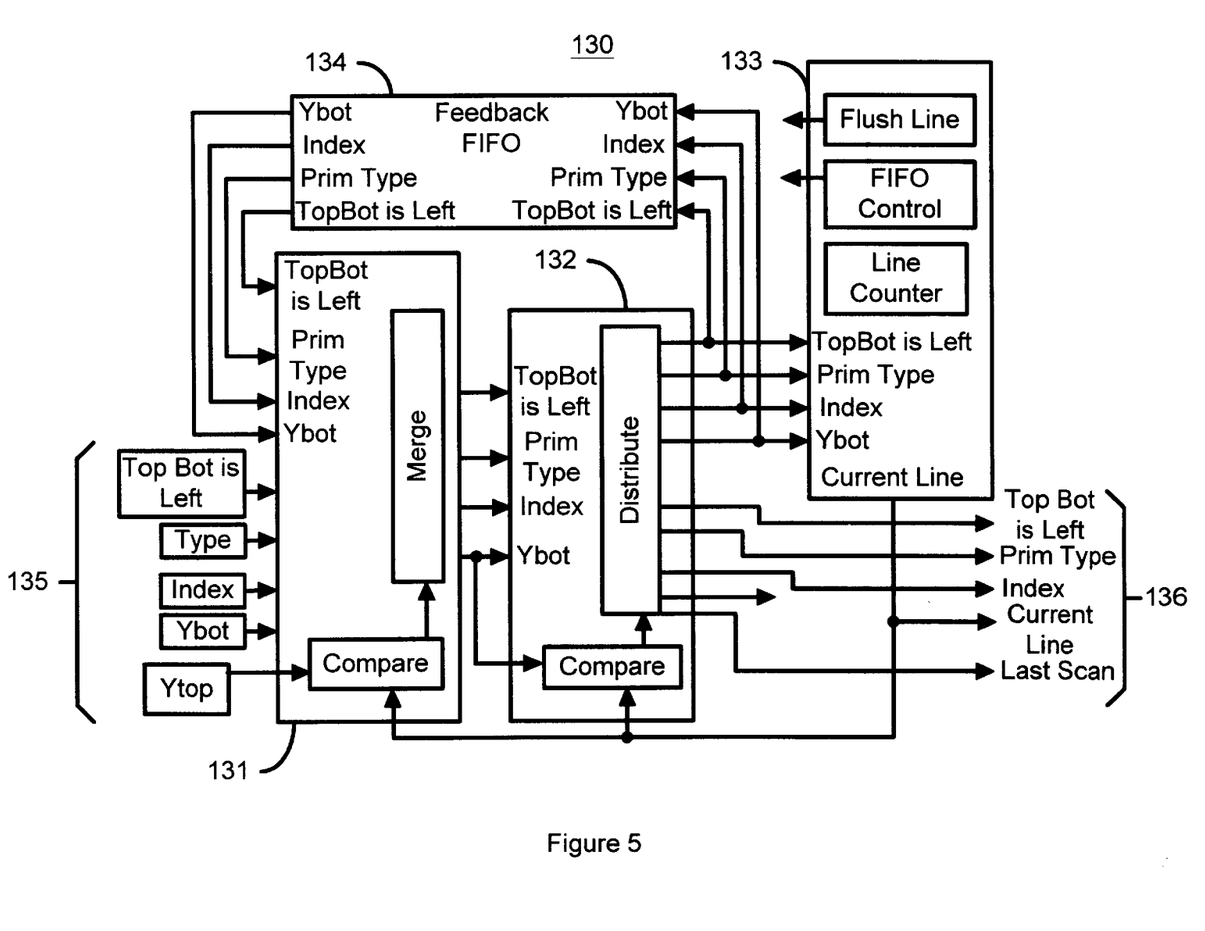
FIG. 5 is a block diagram of one embodiment of a system in accordance with the present invention for more efficiently loading primitives into processors in a computer graphics system.

FIG. 5 is a block diagram of one embodiment of the y-loop circuitry 130 that more efficiently loads primitives into processors in a computer graphics system 100. The y-loop circuitry 130 includes a y-loop merge circuit 131, a y-loop distributor 132, a y-loop feedback circuit 134 and a y-loop controller 133. The y-loop circuitry 130 preferably receives primitives that are ordered based upon the tops of the primitives in the inputs 135. The primitives are preferably triangles. However, nothing prevents the use of primitives having other shapes. The primitives are provided to the y-loop merge circuit 131. The y-loop merge circuit 131 adds new primitives received from the inputs 135 that have tops that are not lower than a current line. The new primitives are merged with those primitives received from the y-loop feedback circuit 134, discussed below. The new primitives and fed back primitives are provided from the y-loop merge circuit 131 to the y-loop distributor 132. The y-loop distributor 132 eliminates expired primitives. An expired primitive has a bottom that is higher than the current line and which, therefore, should not contribute to the current line or subsequent lines. The y-loop distributor 132 then outputs primitives for a current line. The primitives are provided to the sorter 125, depicted in FIG. 4, to be provided to the processor block 120 through the x-loop circuitry 140. The y-loop distributor 132 also provides the primitives to the y-loop feedback circuit 134. The y-loop feedback circuit 134 re-inputs the primitives output by the y-loop distributor 132 to the y-loop merge circuit 131. The y-loop controller 133 controls the y-loop feedback circuit 134, the y-loop distributor 132 and the y-loop merge circuit 131.

The y-loop circuitry 130 allows primitives to be more efficiently input to the processor block 120. In particular, the y-loop circuitry 130 results in primitives being continuously loaded and evicted by the system 100. As a result, any delays at the end of a line due to ejecting and loading of primitives can be reduced or eliminated. Thus, loading of primitives to the processor block 120, via the sorter 125 and the x-loop circuitry 140, in the graphics system 100 can be made more efficient. Furthermore, the y-loop feedback circuitry 134, which is preferably a y-loop FIFO 134, can hold data for a large number of primitives, preferably 1024 primitives. In effect, the FIFO 134 allows the y-loop circuitry 130 to provide data to a large number of processors. Therefore, the y-loop 130 can be used with a large number of virtual (or actual) processors. In a preferred embodiment, the number of actual, physical processors in the processor block 120 is different from the number of virtual processors. The number of virtual processors is set by the number of processors the graphics system 100 appears to have because of the configuration and functions of the processors actually used. In a preferred embodiment, the graphics system 100 has one thousand and twenty-four virtual processors. The number of actual processors 121 and 123 in the processor block 120 is substantially less. In a preferred embodiment, there are sixteen processors 121 and one bypass processor 123 in the processor block 120. However, nothing prevents the use of another number of processors and/or another number of virtual processors.

The sorter 125 is preferably a hardware sorter, as described in co-pending U.S. patent application Ser. No. 09/583,063 entitled "Method and System for Providing Hardware Sort in a Graphics System," filed on May 30, 2000 and assigned to the assignee of the present application. Applicant hereby incorporates by reference the above-mentioned co-pending patent application. However, in an alternate embodiment, the sorter 125 could be formed in another fashion. The sorter 125 sorts the primitives from the y-loop circuitry 130. The sorter 125 sorts the primitives based upon the left edge of the primitives. In a preferred embodiment, the sorter 125 sorts the primitives based upon the left corner of each primitive. The sorter 125 passes the primitives, sorted based upon their left corners, to the x-loop circuitry 140.

Figure 6:
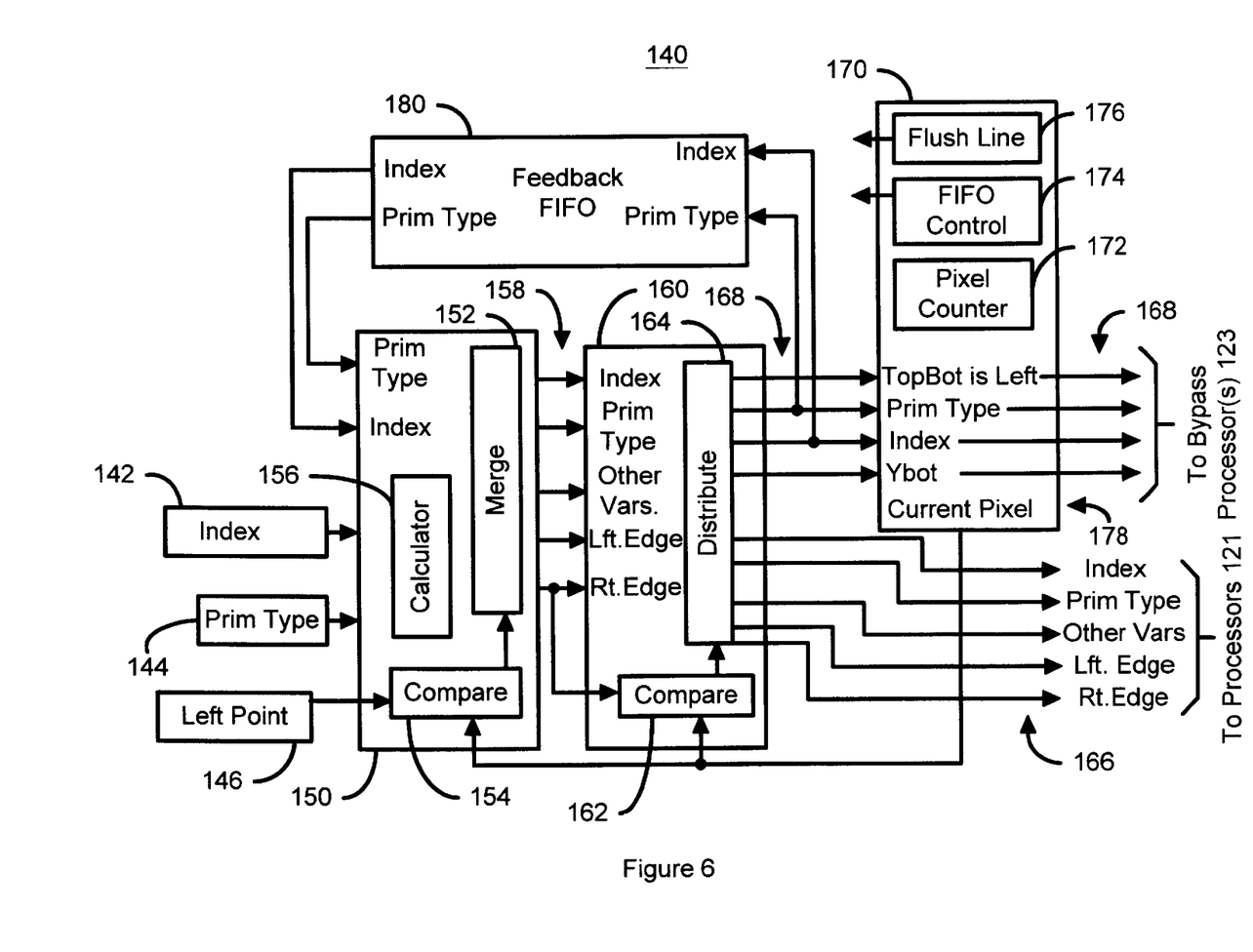
FIG. 6 is block diagram of one embodiment of a system in accordance with the present invention for more efficiently utilizing processors in a computer graphics system.

FIG. 6 is block diagram of one embodiment of x-loop circuitry 140 in accordance with the present invention for more efficiently utilizing processors in a computer graphics system 100. The x-loop circuitry 140 includes a merge circuit 150, a distributor 160, a controller 170 and a feedback circuit 180. The merge circuit 150 receives the primitives from the sorter 125, via inputs 142, 144 and 146. The merge circuit 150 preferably receives the index, primitive type and left corner of the primitive via the inputs 142, 144 and 146.

The controller 170 includes a pixel counter 172, a feedback circuit control block 174, a flush line block 176, and an output 178 for the current position. The pixel counter 172 determines the current position in the line. In other words, the pixel counter 172 determines the current x value. The current position is provided to the merge circuit 150 and the distributor 160 via the output 178. The control block 174 and the flush line block 176 control the feedback circuit 180.

The merge circuit 150 includes a merge block 152, a compare block 154 and a calculator 156. The merge circuit 150 receives new primitives having a furthest left vertex that is left of the current position. The merge circuit 150 determines the primitives to be received by comparing the left vertex (Xleft) with the current position using the compare block 154. The merge circuit 150 also receives any primitives that are being fed back through the x-loop circuit 140 via the feedback circuit 180. The merge circuit 150 also calculates the left and right edges of the primitive for the current line as well as the span of the primitive. The left edge is the farthest left point for the primitive on the current line. The right edge is the farthest right point for the primitive on the current line. The span is the difference between the left and right edges and determines whether the primitive is valid. The primitive is valid if the left edge is not farther right than the right edge.

If no antialiasing is performed, then the span is preferably determined as follows. The left and right edges are determined by calculating the current line (the y coordinate of the current line) and defining which sides of the primitive intersect the current line. Interpolation is then used to calculate the x coordinates at which the sides intersect the current line. The x-coordinates are then preferably rounded off to the nearest pixel to determine the left and right edges. The span is valid if the x coordinate for the left edge is less than the x coordinate for the right edge.

If antialiasing is performed, then the determination of the span is more difficult because antialiasing generally considers each pixel to be made up of a number of subpixels. In a preferred embodiment, each subpixel is considered to be a separate entity. Thus, in a preferred embodiment, the left and right edges and the span are determined as follows when antialiasing is performed. Two lines are determined, a first line for the first row of subpixels and a last line for the last row of subpixels for the current line. If the center of a subpixels is inside or on the border of the primitive, the subpixel is considered to be part of the primitive. If the centers of all of subpixels within a pixel are part of the primitive, the pixel is considered whole (all part of the primitive). Otherwise, the pixel is considered to be partial.

The sides which intersect the first and last line of subpixels are determined. Interpolation is used to calculate the coordinates at which the sides intersect the first and last line of subpixels. The intersection of the left side with the first line and last line of subpixels are termed XL1 and XLF. Similarly, the intersection of the right side with the first line and last line of subpixels are termed XR1 and XRF. If only two sides of the primitive intersect the first and last line of subpixels for the current line, then the left edge is the truncated value of the minimum (farthest left) of XL1 and XLF, plus 1/(number of rows of subpixels). The right edge is the truncated value of the maximum (farthest right) of XR1 and XRF, plus (number of rows of pixels−1)/(number of rows of subpixels). In the preferred embodiment, another left variable is defined by the truncated value of the maximum of XL1 and XLF, plus (number of rows of pixels−1)/(number of rows of subpixels). Another right variable is defined by the truncated value of the minimum of XR1 and XRF, plus 1/(number of rows of subpixels). If the minimum of XL1 and XLF is less than or equal to the maximum of XR1 and XRF, then the span is valid.

In addition, several special cases are preferably considered in calculating the span when antialiasing is performed. In the special cases that a top or bottom vertex of the primitive intersects the current line, then the x coordinates for the edges (discussed above) are substituted with the top or bottom, respectively, of the vertex. If a middle vertex (not the top or the bottom vertex of the primitive) for the primitive is located on the current line and the vertex is the farthest left (or right) portion of the primitive, then the intersection of the top and bottom lines of pixels are set equal to the coordinates of the vertex. If, however, the vertex is not the farthest left or right point in the primitive, then two sides will contribute to the calculation of the edge. In addition, more than one vertex of the vertices may reside in the same pixel. As a result, the pixels in the span are all considered to be partial and the span is calculated as described above.

As described above, interpolation is used to determine the intersections of a side with the current line. The intersection of a side with the current line, termed Xc, is preferably given by:

$$Xc = Xt + (Xb - Xt)Q = Xb(Q) + Xt(1 - Q)$$

where:
$Q = (Yc - Yt)/(Yb - Yt)$
$Xt$ = X coordinate of the top of the side (at the vertex)
$Xb$ = X coordinate of the bottom of the side (at the vertex)
$Yt$ = Y coordinate of the top of the side (at the vertex)
$Yb$ = Y coordinate of the bottom of the side (at the vertex)

In a preferred embodiment, the resultant of the interpolation is rounded to the nearest sub-pixel. In a preferred embodiment, if there is an error introduced due to rounding, up to a full a pixel could be added to or subtracted from the rounded resultant of the interpolation. In a preferred embodiment, the filling of the primitive is determined based upon the intersection of the primitive with the current line. In addition, in a preferred embodiment, an indication of whether the result of the interpolation is rounded is provided.

Thus, in a preferred embodiment, the merge circuit 150 determines the left and right edges, as well as the span of each primitive at the current line. However, in an alternate embodiment, these characteristics of the primitives could be determined by another component. In addition, although the preferred method for determining the span is described above, nothing prevents the span from being determined in another fashion.

The merge circuit 150 thus preferably calculates the left edge, the right edge and the span. The merge block 152 also determines which primitives are valid based upon the span. The merge circuit 150 passes primitives which are valid to the distributor 160. In a preferred embodiment the index and type of the primitive are provided to the distributor, in addition to the left edge, the right edge and the additional left and right variables using outputs 158. The index of the primitive identifies the primitive. The primitive type indicates whether the top or bottom edge is to the left. For a triangle, the bottom edge is to the left when the middle vertex is on the right side of the top and bottom vertices. Similarly, the bottom edge is to the right when the middle vertex is to the left of the top and bottom vertices.

The distributor 160 includes a compare block 162 and a distribute block 164. The distributor 160 compares the current x position with the right edges of the primitives using the compare block 162. If the right edge of the primitive is less than or equal to the current x position (i.e. the entire primitive is to the left of the current position), then the distributor discards the primitive. Thus, primitives which will no longer contribute to the current line are discarded. As a result, fragments for these primitives will not be generated. The distributor provides primitives to the processor block 120 via outputs 166 and 168. The outputs 166 provide the primitives from the distributor 160 to the processors 121. However, the number of processors 121 is limited. As a result, the distributor 166 will provide as many primitives for a particular line as the processors 121 can receive. Thus, if there are sixteen processors 121, then the distributor 160 provides up to sixteen primitives to the processors 121 for a given pixel. If there are additional primitives for the pixel, the remaining primitives are provided to the bypass processors 123 through the outputs 168 and the controller 170. For example, if there are twenty primitives on a particular line, the distributor 160 will provide sixteen primitives to the sixteen processors 121 and provide the remaining four primitives to the bypass processor 123. The remaining four primitives are then processed, one by one, using the bypass processor 123.

Some of the outputs 168 from the distributor 160 are provided to the feedback circuit 180. The feedback circuit 180 is preferably a FIFO. Consequently, the primitive(s) (as embodied in the index and the primitive type) are fed back through the FIFO circuitry 180 and provided to the merge circuit 150. When a new pixel is to be processed, any new primitives are received by the merge circuit 150. The fed back primitive(s) are merged with any new primitives using the merge block 152. The new primitives and the fed back primitive(s) are then again provided to the distributor 160 through the controller 170. As long as they have not expired, the fed back primitive(s) are again passed to the bypass processor 123. A portion of the new primitives is provided to the processors 121 if any processors 121 have become vacant. If the processors 121 are still full, then some portion of the new primitives are provided to the bypass processor 123, along with the fed back primitives. Any primitives (both fed back and new) that are provided to the bypass processor 121 are also provided to the feedback circuit 180 unless the primitive is evicted from the bypass processor 121, as described below.

Thus, the x-loop circuitry 140 loads the processors 121 with primitives for a current line and provides any primitives in excess of the number of processors 121 to the bypass processor 123. The primitives provided to the bypass processor 123 are also fed back to the merge circuit 150 through the feedback circuit 180. The primitives provided to the bypass processor 123 can thus be looped through the x-loop circuitry 150 and provided to the bypass processor 123 for rendering subsequent pixels which the primitives intersect. Because of the use of the bypass processor 123 and the x-loop circuitry 140, the computer graphics system 100 can render a frame in which more primitives than the number of processors 121 intersect pixels of a single line. For the same reason, the computer system graphics 100 can handle situations in which more primitives than the number of processors intersect a single pixel. In a preferred embodiment, in which a single bypass processor 123 is used, it may take longer to process the primitives provided to the bypass processor 123 because a single bypass processor 123 is used for all primitives that are not provided to the processors 121. However, the system 100 is still capable of rendering more complex scenes.

In addition, in a preferred embodiment, the y-loop circuitry 130 is also used. Using the y-loop 130 and the method 200, primitives can be continuously loaded and ejected. As a result, any delays at the end of a line due to ejecting and loading of primitives can be reduced or eliminated. Thus, loading of primitives to the processors 121 in the graphics system 100 can be made more efficient. Furthermore, because the feedback circuit 134 can hold data for a large number of primitives, the y-loop 130 can be used with a large number of virtual (or actual) processors. This feature also allows more primitives to overlap a single pixel.

Figure 7:
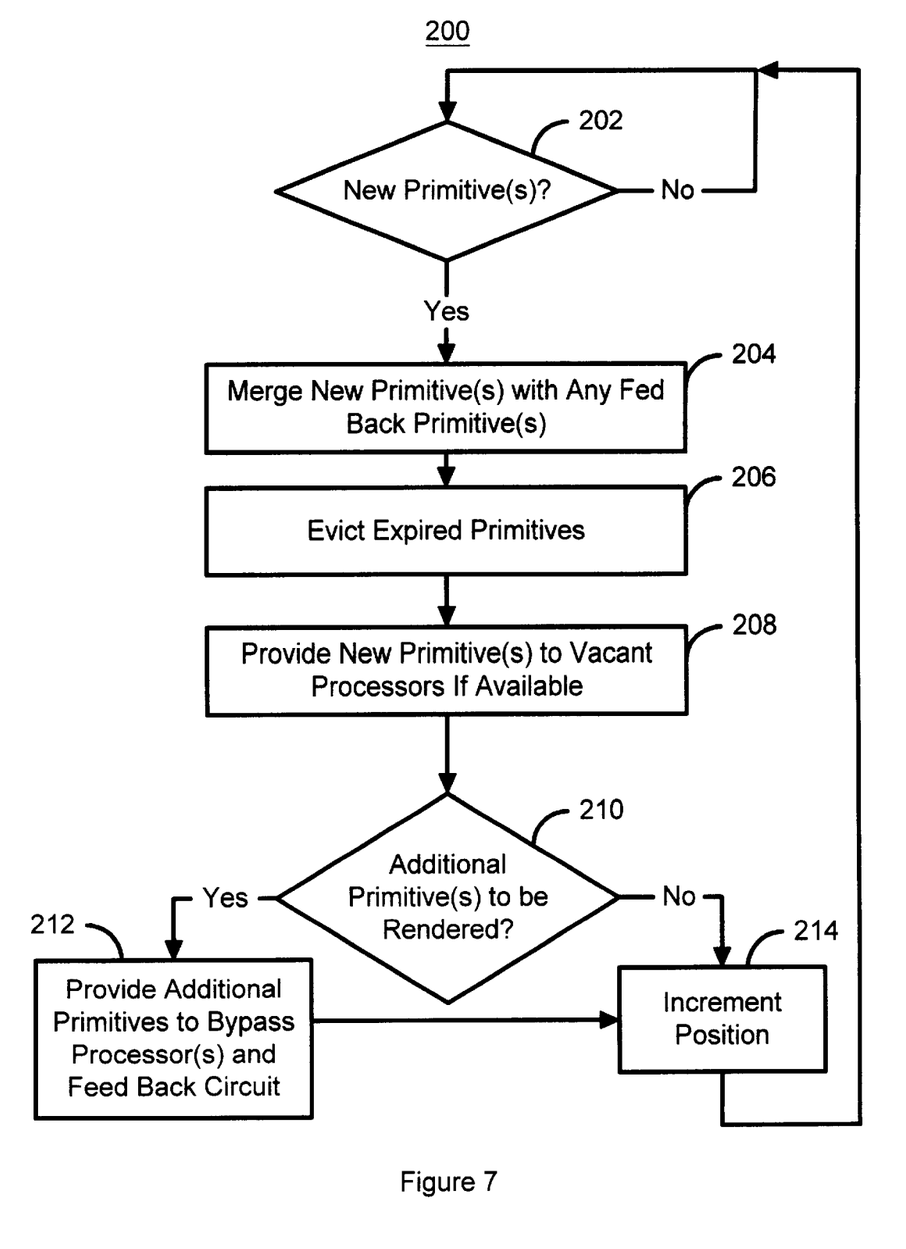
FIG. 7 is a high-level flow chart of one embodiment of a method in accordance with the present invention for more efficiently using processors in a computer graphics system.

FIG. 7 is a high-level flow chart of one embodiment of a method 200 in accordance with the present invention for more efficiently using processors in a computer graphics system. The method 200 preferably uses the system 100. Consequently, the method 200 is described in the context of the computer graphics system 100.

It is determined whether a new primitive for the current line should be provided to the processors 121, via step 202. Step 202 preferably determines whether there are new primitives which commence to the left of the current position. If there are no new primitives, then step 202 is repeated. If there are new primitives, then the new primitives are merged with any fed back primitives, via step 204. Any expired primitives are evicted, via step 206. If any of the processors 121 are available, then at least a portion of the new primitives are provided to the available processors, via step 208. A processor is available if it is not in use for rendering an unexpired primitive for the current position. It is determined whether there are additional primitives, both new and fed back primitives, to be processed, via step 210. If not, the position is incremented to the next pixel in the line, via step 214. If there are additional primitives to be processed, the remaining primitives are provided to the bypass processor and fed back, via step 212. The position is then incremented in step 214 and step 202 returned to.

Because of the use of the bypass processor 123 and because the primitives provided the bypass processor 123 are fed back for processing, the method 200 can render a frame in which more primitives than the number of processors 121 intersect pixels of a single line. For the same reason, the method 200 can handle situations in which more primitives than the number of processors intersect a single pixel. In a preferred embodiment, in which a single bypass processor 123 is used, it may take longer to process the primitives provided to the bypass processor 123 because a single bypass processor 123 is used for all primitives that are not provided to the processors 121. However, the method 200 is still capable of rendering more complex scenes.

Figure 8A:
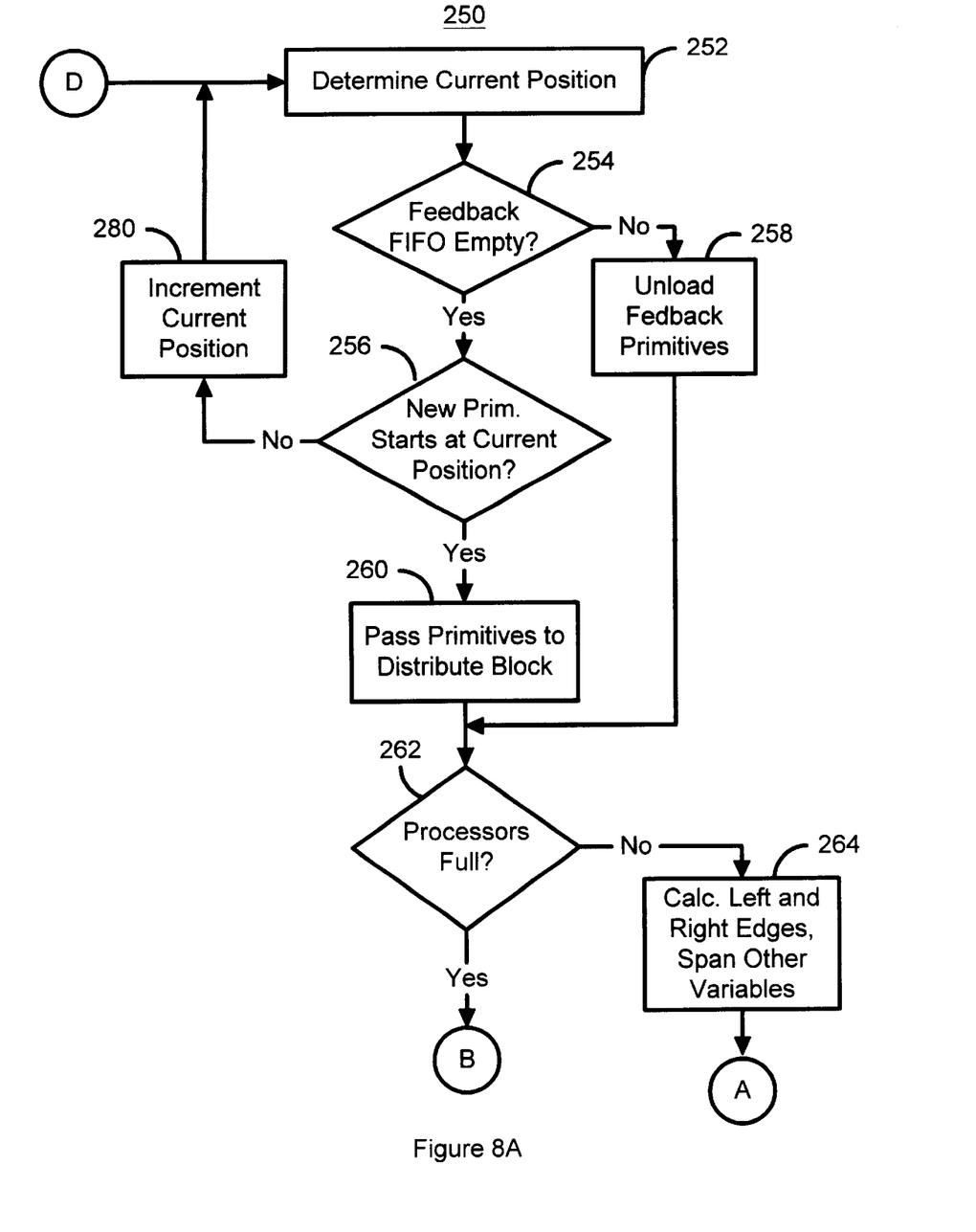
FIGS. 8A and 8B depict a more detailed flow chart of one embodiment of a method in accordance with the present invention for more efficiently using processors in a computer graphics system.
Figure 8B:
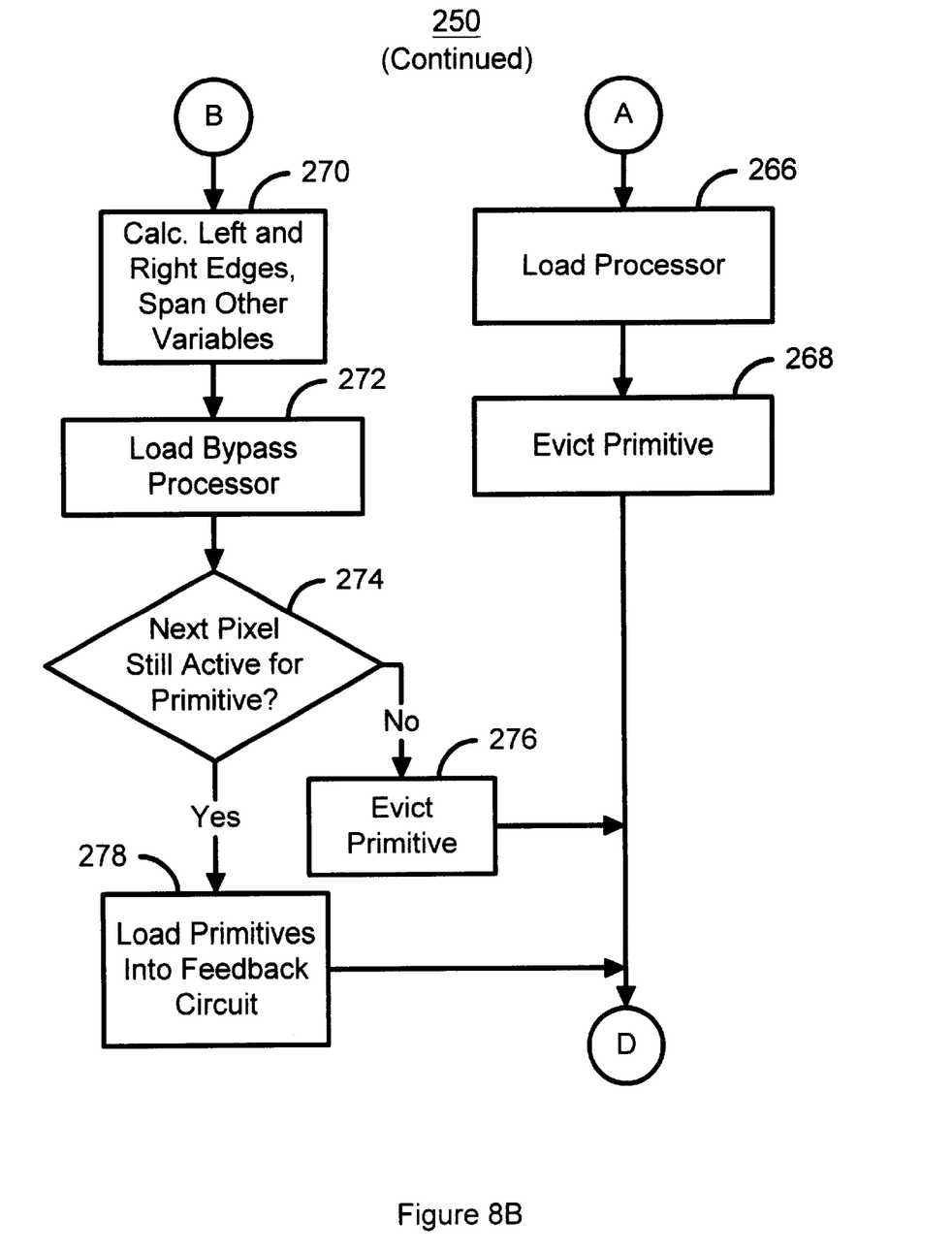

FIGS. 8A and 8B depict a more detailed flow chart of one embodiment of a method 250 in accordance with the present invention for more efficiently using processors in a computer graphics system. The method 250 preferably uses the system 100. Consequently, the method 250 is described in the context of the computer graphics system 100.

The current position in the line is determined, preferably using the pixel counter 172, via step 252. It is determined whether the feedback FIFO 180 is empty, via step 254. If the feedback FIFO 180 is empty, then it is determined whether any new primitives begin at the current position, via step 256. Thus, step 256 determines whether the right edge of any primitive is at the current position. If it is determined in step 256 that no new primitives commence at the current position, then the current position in the line is incremented, via step 280. If it is determined in step 256 that a new primitive does start at the current location, then the primitives are provided to the distribute block 160, via step 260. If it is determined in step 254 that the feedback FIFO 180 is not empty, then the primitives are unloaded from the feedback FIFO 180, via step 258.

After the primitives are unloaded in step 258 or after the primitives are provided to the distribute block 160, then it is determined whether the processors 121 are full, via step 262. Thus, step 262 determines whether there are any processors 121 available for the current primitives. If it is determined in step 262 that the processors are not full, then the span and other variables such as the left and right edges are calculated, via step 264. The primitive and the data calculated in step 264 are provided to the processor 121, via step 266. The primitive is then evicted from the x-loop 140, via 268. The primitive can be evicted because it has been sent to one of the processors 121 and is no longer needed in the x-loop 140.

If it is determined in step 262 that the processors 121 are full, then the span and other variables such as the left and right edges are calculated, via step 270. The primitive and the data calculated in step 270 are loaded to the bypass processor 123, via step 272. It is then determined whether the next pixel would still be active for the primitive, via step 274. Step 274 preferably includes comparing the right edge of the primitive to the next pixel. If the next pixel is not active, then the primitive has completed processing for the current line and is thus evicted from the x-loop 140, via step 276. Otherwise, the primitive is loaded into the feedback FIFO 180, via step 278. The method 250 then returns to determining the current position in the line in step 252.

Using the method 250, the graphics system 100 can render a frame in which more primitives than the number of processors 121 intersect pixels of a single line. For the same reason, the method 250 can handle situations in which more primitives than the number of processors intersect a single pixel. As a result, the graphics system 100 can render a more complex scene while utilizing fewer processors and, therefore, less space in the computer system 100.

A method and system has been disclosed for more efficiently utilizing processors for a graphics system. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for utilizing at least one processor and at least one bypass processor of a computer graphics system, the at least one processor including a particular number of processors, the at least one processor and the at least one bypass processor for rendering a plurality of primitives, each of the plurality of primitives having a left corner and a right corner, the plurality of primitives being ordered based on the left corner of each of the plurality of primitives, the system comprising:

a merge circuit for determining a left edge for each of the plurality of primitives and determining a right edge for each of the plurality of primitives;

a distributor, coupled with the feedback circuit, for outputting a first portion of the plurality of primitives for a current position in a current line, the distributor providing a second portion of the plurality of primitives to the at least one processor and providing a third portion of the plurality of primitives to the at least one bypass processor if the first portion of the plurality of primitives includes more primitives than the particular number of processors, the second portion of the plurality of primitives including a number of primitives that is not greater than the particular number of processors, the distributor also for discarding an expired portion of the primitives, each of the expired portion of the primitives having a right edge to the left of a current position;

a feedback circuit, coupled to the merge circuit and the distributor, for re-inputting a fourth portion of the plurality of primitives to the at least one bypass processor until the first portion of the plurality of primitives has been rendered for a particular line; and a controller for controlling the feedback circuit, the distributor and the merge circuit.

2. The system of claim 1 wherein the merge circuit receives the fourth portion of the plurality of primitives and provides the fourth portion of the plurality of primitives to the distributor and wherein the distributor provides a fifth portion of the plurality of primitives to the at least one bypass processor.

3. The system of claim 1 wherein the merge circuit further determines whether the left edge of the primitive is left of the right edge of the primitive and wherein each of the first portion and the second portion of the plurality of primitives has a left edge that is to the left of the right edge.

4. The system of claim 1 wherein the first portion of the plurality of primitives resides on a single line of a display.

5. The system of claim 1 wherein the merge circuit further calculates a span for each of the plurality of primitives.

6. The system of claim 5 wherein the plurality of primitives are antialiased; and wherein the merge circuit further calculates the span using the left side of the primitive, the right side of the primitive and whether a current pixel is completely covered or partially covered by the primitive.

7. The system of claim 1 wherein the feedback circuit further includes a first in first out ("FIFO") buffer.

8. The system of claim 1 further comprising:

a sorter, coupled with the merge circuit, for sorting the plurality of primitives horizontally.

9. The system of claim 8 wherein sorter sorts the plurality of primitives horizontally from left to right, based upon the left edge of the primitive.

10. The system of claim 8 wherein the sorter is a hardware sorter.

11. The system of claim 8 further include y-loop circuitry for providing the first of the plurality of primitives for a current line to the sorter.

12. The system of claim 11 wherein each of the plurality of primitives has a top and a bottom, wherein the plurality of primitives are sorter based on the top of each of the plurality of primitives and wherein the y-loop circuitry further includes:

at least one input for receiving data relating to each of the plurality of primitives;

a second merge circuit, coupled with the input, for adding the data for a primitive having a top that is not lower than a current line;

a second distributor, coupled with the second merge circuit, for eliminating an expired primitive and outputting the data for a remaining portion of the primitives after the expired primitive has been removed, the expired primitive having a bottom that is above a current line;

a second feedback circuit, coupled with the second distributor and the second merge circuit, for re-inputting to the second merge circuit the data for the remaining portion of the plurality of primitives; and a second controller for controlling the second feedback circuit, the second distributor and the second merge circuit.

13. A method for utilizing at least one processor and at least one bypass processor of a computer graphics system, the at least one processor including a particular number of processors, the at least one processor and the at least one bypass processor for rendering a plurality of primitives, each of the plurality of primitives having a left corner and a right corner, the plurality of primitives being ordered based on the left corner of each of the plurality of primitives, the method comprising the steps of:

(a) providing a first portion of the plurality of primitives for a current position in a current line to the at least one processor if the at least one processor is not full using a distributor;

(b) providing a second portion of the plurality of primitives to the at least one bypass processor if the at least one processor is full using the distributor;

(c) re-inputting a fourth portion of the plurality of primitives to the at least one bypass processor until the first portion of the plurality of primitives has been rendered for a particular line; and (d) using the distributor to discard an expired portion of the primitives prior to providing the first and second portions of the primitives to the at least one processor and the at least one bypass processor, each of the expired portion of the primitives having a right edge to the left of a current position.

14. The method of claim 13 further comprising the step of:

(e) determining whether the left edge of the primitive is left of the right edge of the primitive, wherein each of the first portion and the second portion of the plurality of primitives has a left edge that is to the left of the right edge.

15. The method system of claim 13 wherein the first portion of the plurality of primitives resides on a single line of a display.

16. The method of claim 13 further comprising the step of:

(e) calculating a span for each of the plurality of primitives.

17. The method of claim 16 wherein the plurality of primitives are antialiased and wherein the span calculating step (e) further includes the step of:

(e1) calculating the span using the left side of the primitive, the right side of the primitive and whether a current pixel is completely covered or partially covered by the primitive.

18. The method of claim 13 further comprising the step of:

(e) sorting the plurality of primitives horizontally prior to determining the left edge of each of the plurality of primitives.

19. The method of claim 18 wherein the sorting step (e) further includes the step of:

(e1) sorting the plurality of primitives horizontally from left to right, based upon the left edge of the primitive.

20. The method of claim 18 further comprising the step of:

(f) providing the first portion of the plurality of primitives for a current line to a sorter for performing the sorting step (e).

21. The method of claim 20 wherein each of the plurality of primitives has a top and a bottom, wherein the plurality of primitives are sorter based on the top of each of the plurality of primitives and wherein the first portion providing step (f) further includes the steps of:

(f1) determining whether the top of at least one new primitive of the plurality of primitives is not lower than a current line;

(f2) merging data for the at least one new primitive if the top is not lower than the current line;

(f3) eliminating an expired primitive and outputting at least a portion of data for a remaining portion of the primitives after the expired primitive has been removed, the expired primitive having a bottom that is above the current line, the data output by the distributor controlling loading of the plurality of primitives by the at least one processor;

(f4) re-inputting to the merge circuit data for the remaining portion of the plurality of primitives.

22. The system of claim 1 wherein the current line is a current line being rendered.

23. The method of claim 13 wherein the current line is a current line being rendered.

* * * * *